United States Patent [19]

Campioni

[11] 4,021,842
[45] May 3, 1977

[54] DEMODULATING CIRCUIT FOR COLOR TELEVISION SIGNALS

[75] Inventor: Armando Campioni, Turin, Italy

[73] Assignee: Indesit Industria Elettrodomestici Italiana S.p.A., Italy

[22] Filed: Apr. 28, 1975

[21] Appl. No.: 572,675

[52] U.S. Cl. .................................. 358/24; 358/16; 358/18
[51] Int. Cl.² ......................................... H04N 9/50
[58] Field of Search ................. 358/24, 25, 18, 23, 358/16, 19, 20

[56] References Cited

UNITED STATES PATENTS

| | | | |
|---|---|---|---|
| 3,424,999 | 1/1969 | Spies | 358/25 X |
| 3,534,156 | 10/1970 | Henze | 358/18 |
| 3,548,084 | 12/1970 | Kroner | 358/24 X |
| 3,553,357 | 1/1971 | Carnt | 358/18 |
| 3,555,174 | 1/1971 | Bruch | 358/18 |
| 3,763,309 | 10/1973 | Palladino | 358/18 |
| 3,877,066 | 4/1975 | Van Gils et al. | 358/18 |

OTHER PUBLICATIONS

Patchett, *Colour Television: The Pal System*, 1967, p. 151.

*Primary Examiner*—John C. Martin
*Assistant Examiner*—Mitchell Saffian
*Attorney, Agent, or Firm*—Ladas, Parry, Von Gehr, Goldsmith & Deschamps

[57] ABSTRACT

A circuit arrangement for demodulating the chrominance signal portion of a color television signal in an apparatus for receiving at least said color television signal is described. The chrominance signal to be demodulated is of the type that is coded according to the ISA (Identify Suppressing Alternately) system, i.e. the chromatic information modulates in amplitude by carrier suppression a subcarrier along two axes in quadrature, one of the axes being switched 180° each line, a single reference signal of constant phase being inserted only every second line and serving as a reference signal for the demodulation of said subcarrier and as an identification signal for the switching. According to the invention, an electronic gate is provided which opens during part of every second line scanning period to allow the passage of the single reference signal to a passive crystal filter. An amplitude detector circuit receives a plurality of oscillations at subcarrier frequency from the filter and supplies an identification signal for a switching voltage generator which controls the electronic gate and synchronizes a change-over switch which operates at line frequency for obtaining the demodulated chromatic information.

11 Claims, 4 Drawing Figures

DEMODULATING CIRCUIT FOR COLOR TELEVISION SIGNALS

BACKGROUND OF THE INVENTION

The present invention relates to a circuit arrangement for apparatus capable of receiving a color television signal, coded according to a system in which the chromatic information modulates in amplitude by carrier suppression a subcarrier along two axes in quadrature, one of the axes being switched 180° each line, a single reference signal of constant phase serving as a reference signal for the demodulation of said subcarrier and as an identification signal for said switching, said single signal being inserted only every second line; said circuit arrangement being arranged to process the chrominance signal in order to provide the identification signal for said switching.

Such a color television system (ISA system) constitutes an improvement of the PAL system (Phase Alternative Line) in which, as well known, the chromatic information modulates (with suppressed carrier), in amplitude and phase, a color subcarrier. In said PAL system, the modulation direction (phase) at alternate lines is overturned with respect to a fixed axis; and there is further inserted, during the blanking period of each line, a reference signal (burst) constituted by ten oscillations at the subcarrier frequency, whose phase is also alternating, of 45° with respect to said fixed axis.

the first, in the suppression of said reference signal during the lines in which the phase of the chromatic information is overturned; this variant is indicated, in the continuation of present specification, by the name of ISA-P system;

the second, in the inserting of said reference signal with a phase corresponding to the fixed axis (that is, with the same phase used in the NTSC system) but only in the lines wherein the chromatic information is not inverted; in the continuation of present specification, this variant is indicated by the name of ISA-N system. (ISA for Identity Suppressing Alternately).

When a signal, according to any one of the mentioned systems is received, it is usual to provide two synchronous demodulators for obtaining the two "color difference" signals commonly indicated as B − Y and R − Y signals. A persistent oscillation at subcarrier frequency having the phase of the fixed axis, is forwarded to the first of said demodulators; a quadrature oscillation whose phase is inverted at line frequency, by means of a change-over switch, under the command of a switching voltage generator, is forwarded to the second.

In order to synchronize the switching voltage generator, it is ususl in the PAL system to provide a phase comparator which compares the oscillation produced with the arriving reference signals, and thereby produces a signal at 7.8 Hz (half line frequency) which is used as a signal to identify the switching of the generator.

SUMMARY OF THE INVENTION

The object of the present invention is to provide a new circuit arrangement capable of processing the chrominance signal of a color television system, having a single signal inserted only every second line serving as reference signal and as identification signal (ISA), in order to provide the identification signal for the switching, which circuit arrangement ensures intrinsically a better protection against disturbances, and provides, reliable operation.

According to the present invention there is provided a circuit arrangement for demodulating the chrominance signal portion of a color television signal in a apparatus for receiving at least said color television signal, the chrominance signal being coded according to a system in which two color-difference signals are inserted by means of a subcarrier modulation process, a periodical line scanning frequency switching of the subcarrier phase taking place, there being present in said chrominance signal a single signal of constant phase having a plurality of oscillations at the subcarrier frequency and serving as a reference signal for the demodulation of said subcarrier and as an identification signal for controlling a change-over switch which operates at line frequency to ensure that the two color-difference signals are demodulated with correct phases of said reference subcarrier, said single signal being inserted in part of every second line scanning period of said modulated subcarrier, said arrangement comprising a passive crystal filter, at least a first electronic gate which opens during every second line scanning period, said first gate receiving said chrominance signal and allowing the passage of said single signal to said passive crystal filter which supplies a plurality of oscillations at the frequency of said subcarrier, an amplitude detector circuit which receives said plurality of oscillations from said filter for supplying said identification signal, and a switching voltage generator controlled by said identification signal for controlling said opening of said first gate at every second line and providing a signal to drive said change-over switch.

BRIEF DESCRIPTION OF THE DRAWINGS

The invention will now be described with reference to the accompanying drawings which are given only by way of non limitative example and in which.

DETAILED DESCRIPTION OF THE INVENTION

Figure 1:
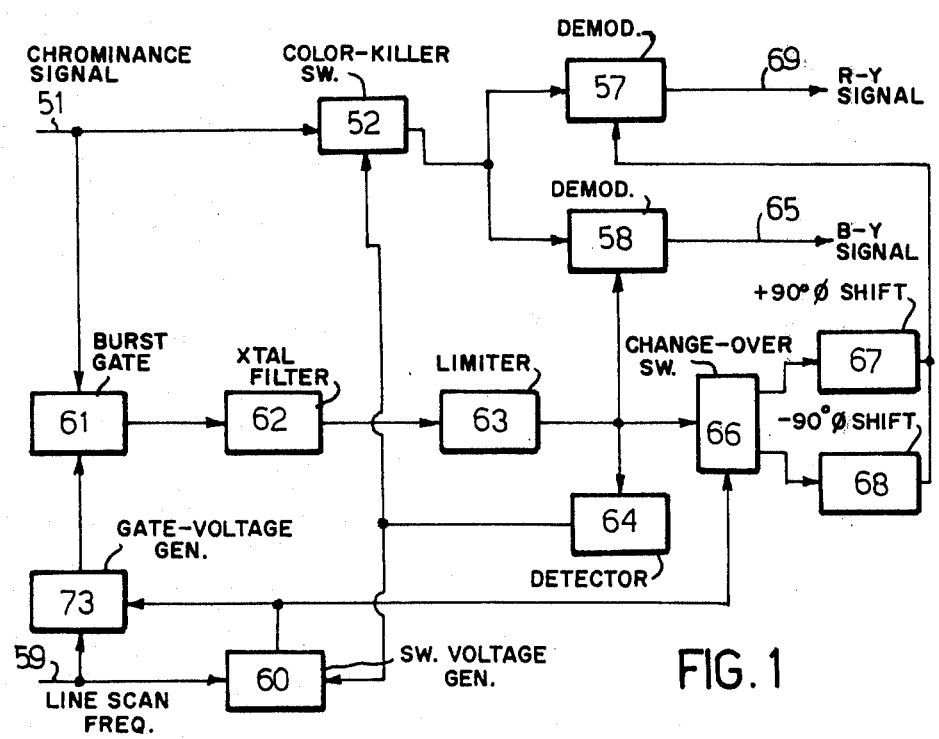
FIG. 1 is a block diagram of a demodulating circuit according to the invention for a color television receiver adapted to receive a color television signal having a single reference signal inserted only every second line (ISA)

With reference to FIG. 1, reference numeral 51 indicated a complete chrominance signal of subcarrier frequency, separated in known manner from the luminance signal, and containing the chromatic informations representing the so-called color differences (for example, the information B−Y and the information R−Y) which modulate in amplitude and with modulation axes in quadrature s suppressed subcarrier (the modulation axis of the information R−Y being switched 180° each line), and the single reference and identification signal which consists of a certain number of oscillations of subcarrier frequency and having constant phase for example B−Y, (system ISA−N) inserted every second line on the rear pedestal (back porch) of line blanking, after the line synchronism pulse and before the beginning of the information. Reference numeral 52 indicates an electronic switch, well known in itself, whose signal input receives the signal 51.

The output of the switch 52 is connected to the signal inputs of two synchronous demodulators 57 and 58.

Reference numeral 59 indicates a line scanning frequency signal of suitable duration, amplitude and phase, obtainable in a known manner from the line scanning circuits, which reaches a switching voltage generator 60, which may be for instance a normal bistable multivibrator, and a gate voltage generator 73 which is substantially an AND circuit and which also receives the output signal of the switching voltage generator 60. The output of the gate voltage generator 73 is connected to control an electronic gate (burst-gate) 61, known in itself, to which the signal 51 is supplied and which separates the reference and identification signal from the complete chrominance signal.

The output of the gate 61 is supplied to a subcarrier reference regenerator 62, constituted substantially by a passive crystal filter of high selectivity, tuned on the frequency of said subcarrier, to be used for the demodulation of the chrominance signals. The output of the regenerator 62 is connected to the input of an amplitude limiting circuit 63 whose output is connected to the input of an amplitude detector circuit 64, for example an envelope detector.

The output of the circuit 63 is also supplied both to another input of the demodulator 58, from which a color difference signal 65 is obtained, and to the input of an electronic change-over switch 66, whose control signal originates from the switching voltage generator 60. The two outputs of the switch 66 are supplied to two phase shifter circuits 67 and 68, which introduce at the subcarrier frequency a phase displacement of 90° in advance and in delay, respectively. The outputs of the two phase shifter circuits 67 and 68 are, thus, connected together and are supplied to another input of the demodulator 57, from which another information of color difference 69 is obtained.

The output of the circuit 64 reaches both a second control input of the switching voltage generator 60, and the control input of the switch 52.

The operation of the circuit shown in FIG. 1 takes place as follows. Let us assume initially that the switch 52 forwards the signal 51 to the demodulators 57 and 58. The demodulator 58 receives furthermore the subcarrier regenerated in the regenerator 62 and limited in the circuit 63, having the phase of the reference signal (P—Y). Therefore, said demodulator 58 demodulates the chrominance signal 51 according to such phase so as to obtain detected the color information 65, in this case the informaiton B—Y. The demodulator 57, instead, receives a subcarrier frequency in quadrature with the reference signal, which frequency is inverted every line (because of the combined action of the circuits 60, 66, 67 and 68). Therefore, the demodulator 57 is controlled to obtain the color information 69, R—Y which is alternating, demodulated; in particular, there will be available the information R—Y if the generator 60 has the correct phase, or the information Y—R if the generator 60 operates with inverted phase with respect to the analogous generator of the transmitter. If the phase of the generator 60 is correct, the gate 61, which receives a pulse from the circuit 73 every second line, opens only when a reference signal is present in the signal 51. In this case, generator 62 produces a persistent oscillation for the demodulators 57 and 58. The persistent oscillation which is present at the output of the generator 62 has no constant amplitude; it has a maximum value immediately after the arrival of a reference signal, then it decreases exponentially for 128 microseconds, till the arrival of the subsequent reference signal. At the output of the detector 64 there is present a rectified voltage having the same behaviour, constituted by a succession of pulses having half line frequency, which pulses, applied to the generator 60, maintain it in the correct phase. Simultaneously, the same rectified voltage of the circuit 64 serves to maintain in position the switch 52.

Said switch 52 accomplishes the function of a color-killer. In fact, in case of reception of a monochromatic television signal there is no reference signal, the regenerator 62, which is no longer activated, no longer supplies oscillations and therefore also the voltage rectified by the circuit 64 is missing; consequently, the switch 52 changes position and the passage of the signal 51 to the demodulators 57 and 58 is interrupted, thereby preventing disturbances and noise from being demodulated and from interfering adversely with the monochromatic image. If the phase of the generator 60 in not correct, the gate 61 opens during the lines in which there is no refernce signal; no osicllation is generated by the regenerator 62 and no voltage is present at the output of the detector 64. Accordingly, the generator 60 changes phase and resets. For this mode of operation of the generator 60 it is suitable to use the integrated circuit TAA 630, which has a synchronization additional input represented by the pin No. 1 in a catalogue, and said direct voltage at the output of detector 64 is forwarded to said synchronization additional input.

In such a way, when there is no direct voltage, a pulse reaches said pin No. 1 and causes the change of the multivibrator state.

However, this circuit arrangement has, so to say, only one possibility for a good operation; if for any reason the generator 60 doesn't reset, nothing more happens.

The advantage of the illustrated circuit consists mainly in that, owing to the selectivity of the crystal of the regenerator 62, a high protection of the identification signal against disturbances is ensured. Therefore, it is possible to send the signal directly to the generator 60, without interposing a tuned filter having a half line frequency.

Figure 2:
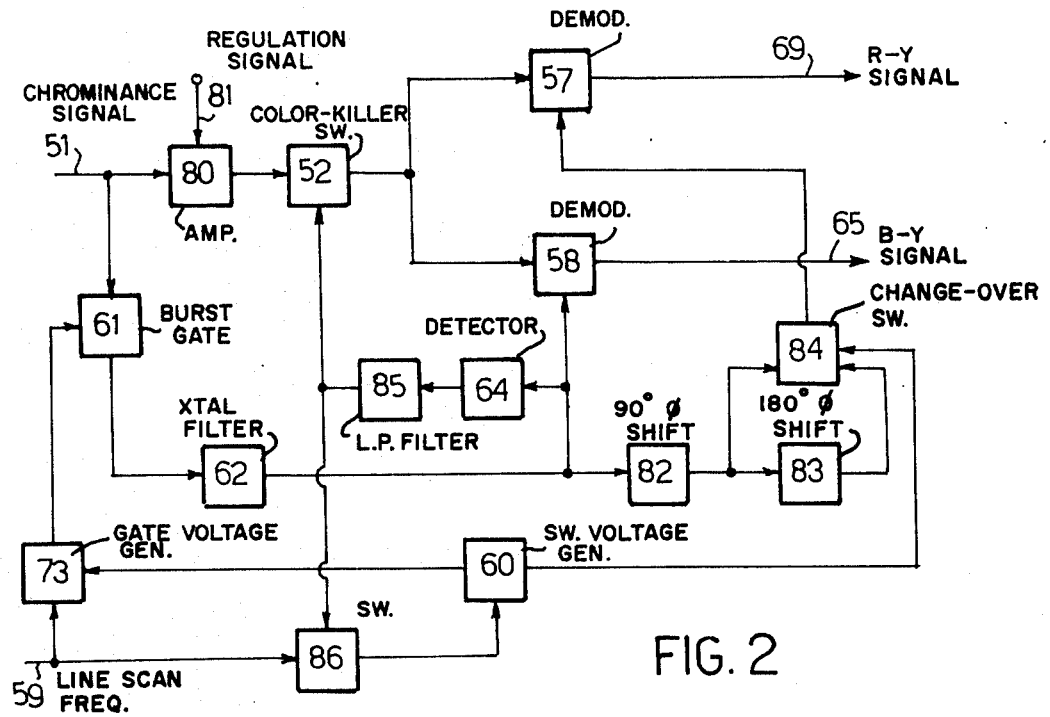
FIG. 2, 3, and 4 respectively show a block diagram of various modified embodiments of the demodulating circuit of FIG. 1.

FIG. 2 shows then a variation of the circuit arrangement of FIG. 1, in which the direct voltage which is present at the output of the amplitude detector circuit 64 is utilized in such a way as to ensure a more reliable operation.

In said FIG. 2, the blocks whose function and circuit arrangement are equal to those of the blocks shown in FIG. 1 are indicated by the same reference numerals.

The chrominance signal 51 reaches the electronic switch 52 through an amplifier 80 whose gain is adjustable by means of a regulation signal 81; said signal 81 may be obtained, for example, by the manual control of the saturation.

The output of the regenerator 62 constituted by a selective crystal filter eventually followed by an amplifier, reaches the synchronous demodulator 58, the amplitude detector circuit 64 and a phase shifter circuit 83 which introduces at the frequency of the subcarrier a phase displacement of 90°. The output of the phase shifter circuit 82 is connected directly and through a phase shifter circuit 83, which shifts the phase through 180° at the frequency of the subcarrier, to the two inputs of an electronic change-over switch 84 whose control input comes from the switching voltage generator 60. The output of the switch 84 is connected to an input of the demodulator 57.

The output of the detector 64 is supplied, through a low-pass filter 85, to the control inputs of the electronic switch 52 and of an electronic switch 86, comprising for instance a transistor, which is interposed on the input connection of the signal 59 at line scanning frequency, to the switching voltage generator 60.

The switch 52 and the switch 86 interrupt the passage of the signal into the respective circuits when the detector circuit 64 does not supply any signal (or supplies a signal having an insufficient amplitude).

The circuit of FIG. 3 differs from the circuit described with reference to FIG. 2 in that the electronic switch 86 is omitted, and the signal 59 is supplied directly to the switching voltage generator 60. An analogous switch 90, still controlled by the signal at the output of the low-pass filter 85, is, instead, disposed between the switching voltage generator 60 and the gate voltage generator 73. Furthermore, the output of the amplitude detector circuit 64 is supplied, through a high-pass filter 91, to an asymmetric synchronization input of the generator 60.

It is further pointed out that, while the signal 59 is supplied in parallel to the control electrodes of the two active elements (for instance, transistors) of the bistable multivibrator of the generator 60, the signal coming from the circuit 91 has to be supplied to only one of said electrodes. (In the case of the above-mentioned integrated circuit TAA 630 it has to be supplied to the pin No. 1).

Figure 3:
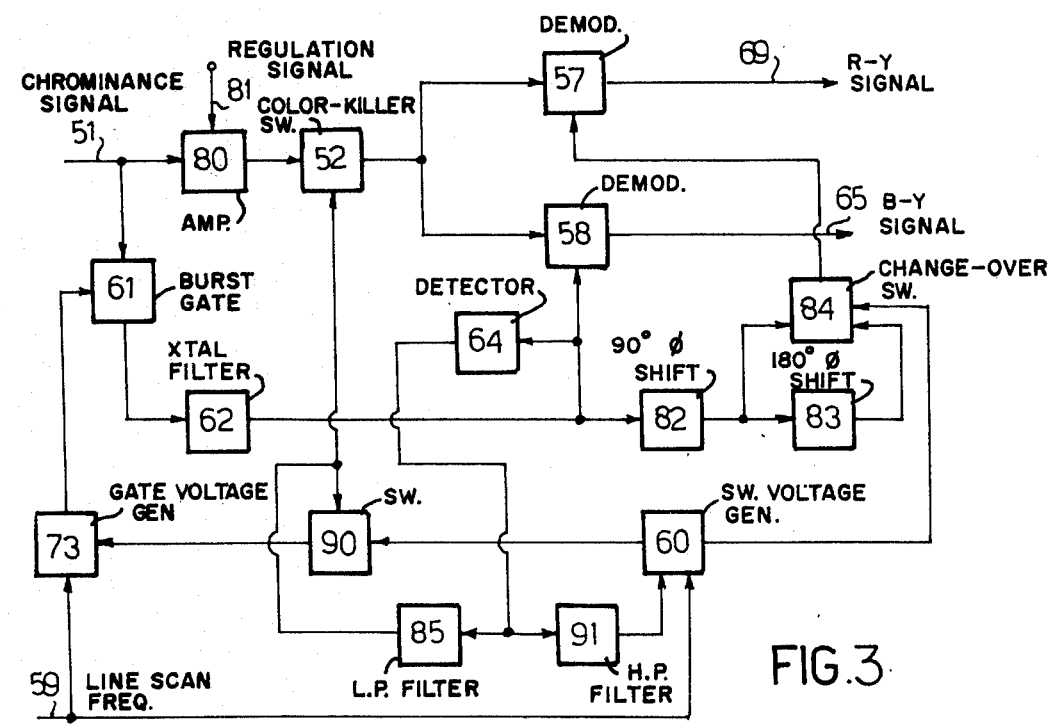
Figure 4:
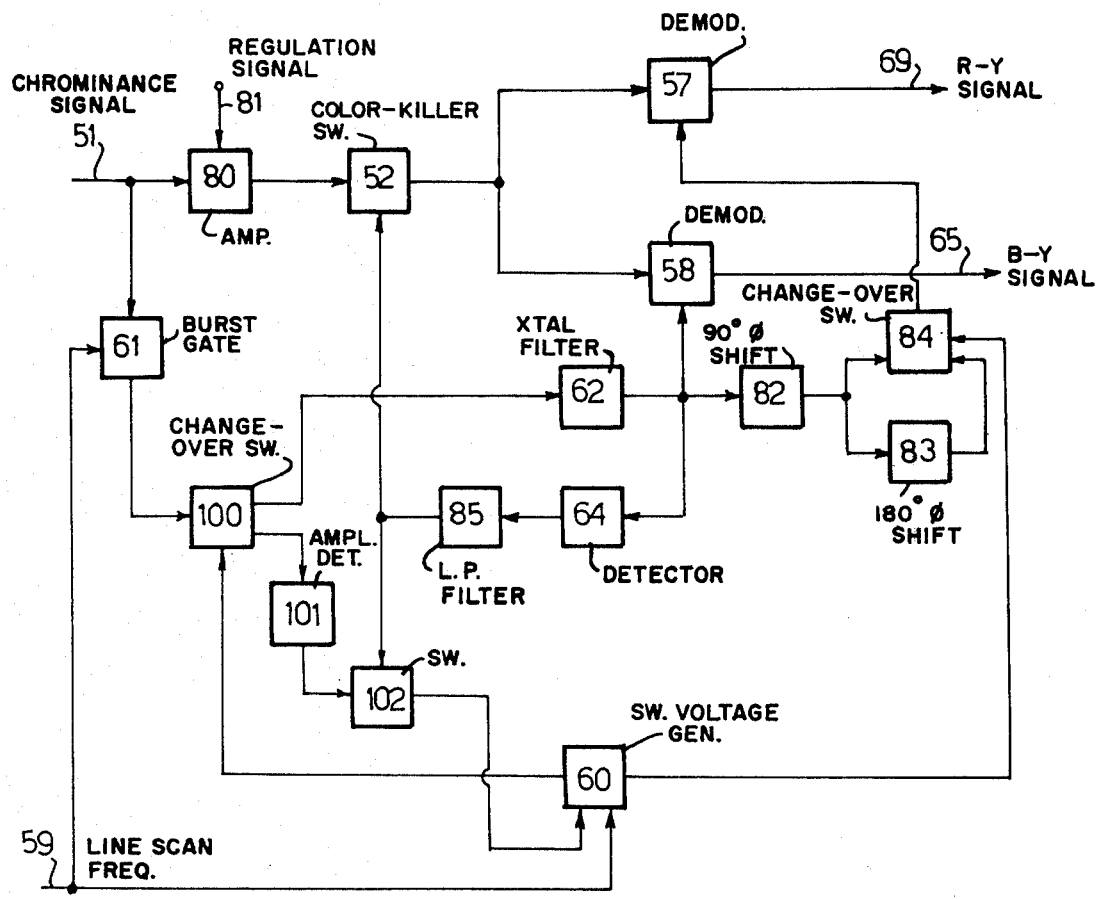

In the circuit of FIG. 4, as compared with the circuit of FIG. 3, there is no gate-voltage generator 73, and the signal 59 is supplied directly to the control input of the gate 61. The output of said gate 61 is connected to the input of an electronic change-over switch 100 whose two outputs are connected, respectively, to the regenerator 62, formed by a crystal filter, and to an amplitude detector circuit 101. The control signal for the switch 100 originates from the switching voltage generator 60. The output of the detector circuit 101 reaches an electronic switch 102, controlled by the output signal from the low-pass filter 85, and the output of said switch 102 reaches a synchronization asymmetric input of the generator 60.

The operation of the circuit of FIG. 2 takes place as follows.

Owing to the gate-voltage generator 73, the signal 59 arrives at the gate 61 every second line; therefore, said gate 61 opens only every second line.

At this point there are two cases: either the phase of the switching voltage generator 60 is such that gate 61 opens in the lines in which a reference signal is present (correct switching phase); or the phase of the generator 60 is such that the gate 61 opens in the lines in which there is no reference signal (incorrect switching phase). Suppose not, for instance, that the first case occurs (correct switching): the reference signals reach the regenerator 62; the latter produces an oscillation in phase with said signals, which oscillation is applied to the synchronous demodulator 58, while the demodulator 57 receives an alternating oscillation with phase in quadrature to demodulate correctly the alternating R−Y signal which is characteristic of the PAL system. Therefore, the demodulated signal 69 is the signal R−Y and the demodulated signal 65 is the signal B−Y.

The oscillation produced by the regenerator 62 is detected in the circuit 64 and the direct voltage produced, filtered by the filter 85, serves to maintain closed the switches 52 and 86, thereby allowing the demodulators 57 and 58 to receive the signals 51, and the generator 60 to receive the signals 59.

Conversely, if the switching phase is not correct, then no refernce signals reach the regenerator 62, the oscillation ceases and therewith ceases also the voltage at the output of the detector circuit 64 which maintained closed the switches 52 and 86. The latter open and, in particular, the generator 60 stops. As the generator stops, the signals 59 begin to arrive at gate 61 every line; the regenerator 62 begins oscillating again and the switches 52 and 86 close again; the generator 60 restarts. If it restarts correctly, then this is the first case; otherwise the generator stops again and the process continues until a correct switching voltage is produced. The only stable state of the system is the correct state. By acting suitably on the time constant of the filter 85 it is possible to obtain that the period of time during which the generator 60 remains stopped be such as to have the maximum chances that when it restarts it will change phase; thus, one avoids repeating useless attempts.

The circuit shown in FIG. 3, instead of being based on a casual identification system, as the one illustrated in FIG. 2, is based on a positive identification system.

The operation of the circuit of FIG. 3 takes place as follows; owing to the gate voltage generator 73, the gate 61 operates at half line frequency (7.8 KHz), as long as the switching is in the correct phase (in this case, in fact, there is oscillation of the regenerator 62 and direct voltage in output from the detector circuit 64 and the switch 90 remains closed); simultaneously, the filter 91 transfers to the generator 60 an approximately sawtooth-shaped voltage, having the frequency of 7.8 KHz, which is produced because the amplitude of the oscillation obtained by the regenerator 62 is not constant, but has its maximum value at the arrival of reference signals and then decreases exponentially, according to the factor of merit of the crystal filter, for about 125 microseconds elapsing between two successive reference signals. This sawtooth voltage synchronized positively the generator 60.

If the switching starts with an incorrect phase, no signal comes out from the circuit 64, the switch 90 opens, the gate 61 begins to open at every line, the regenerator 62 begins to oscillate, and the generator 60 receives the sawtooth signal from the filter 91 which immediatedly resets it.

When the gate 61 opens at every line, in the lines wherein no reference signal is present the regenerator 62 receives a disturbing pulse constituted by the background noise. This puls, in the case of a very weak signal, may hinder the resetting of the generator 60. However, it has to be noted that as soon as the generator resets in phase the disturbance ceases.

However, the circuit of FIG. 4 has not the aforementioned disadvantage.

In fact, if the switching phase is correct, the reference pulses reach the regenerator 62 and the eventual noise pulses of the alternate lines reach the detector 101. However, the switch 102 is open and consequently the generator 60 receives only the signals 59 and continuues operating undisturbed.

If the switching phase is incorrect, then the reference pulses reach the detector 101 and, in detected condition, through the switch 102, the generator 60, thereby resetting it in phase. The switch 102 is closed now, because there is no oscillation of the regenerator 62.

The advantages of a reliable and sure operation of the circuit arrangements described according to the invention appear clearly from the foregoing. It is also obvious that variations different from those illustrated by way of example, are possible without departing from the scope of the invention.

What I claim is:

1. Circuit arrangement for demodulating the chrominance signal portion of a color television signal in an apparatus for receiving at least said color television signal, the chrominance signal being coded according to a system in which two color-difference signals are inserted therein by means of a subcarrier modulation process and simultaneously transmitted, a periodic line scanning frequency switching of the subcarrier phase taking place, there being present in said chrominance signal a single signal of constant phase having a plurality of oscillations at the subcarrier frequency and serving as a reference signal for generation of a reference subcarrier for the demodulation of said modulated subcarrier and as an identification signal for controlling a change-over switch which operates at line frequency to ensure that the two color-difference signals are demodulated with correct phases of said reference subcarrier, said single signal being inserted in part of every second line scanning period of said modulated subcarrier, said arrangement comprising a passive crystal filter, at least a first electronic gate which opens during every second line scanning period, said first gate receiving said chrominance signal and allowing the passage of said single signal to said passive crystal filter which supplies a pluraltiy of oscillations at the frequency of said subcarrier, an amplitude detector circuit which receives said plurality of oscillations from said filter for supplying said identification signal, and a switching voltage generator controlled by said identification signal for controlling said opening of said first gate at every second line and providing a signal to drive said change-over switch.

2. The circuit arrangement of claim 1, wherein an amplitude limiting circuit is coupled between said passive crystal filter and said amplitude detector circuit.

3. The circuit arramgement of claim 1, wherein a gate-voltage generator, which receives line frequency signals as one input and a signal from said switching voltage generator as a second input, provides a control signal for said first gate in response to these inputs.

4. The circuit arrangement of claim 3, wherein said switching voltage generator is a bi-stable multivibrator which receives line frequency pulses through a second electronic gate, said second gate being controlled by said identification signal so as to prevent said line frequency pulses from reaching said switching voltage generator when the amplitude of said identification signal is lower than a predetermined value.

5. The circuit arrangement of claim 4, wherein said identification signal is supplied to control said second gate through a low-pass filter.

6. The circuit arrangement of claim 3, wherein said switching voltage generator is a bi-stable multivibrator which receives line frequency pulses as one input and said identification signal from said amplitude detector circuit as a second input.

7. The circuit arrangement of claim 6, wherein said identification signal is supplied from said detector circuit to a synchronization input of said switching voltage generator through a high-pass filter, said identification signal comprising a component whose frequency is equal to half the line scanning frequency.

8. The circuit arrangement of claim 7, wherein a second electronic gate is disposed in the path from said switching voltage generator to said first gate, said second gate being controlled by said identification signal so that said first gate opens at alternate lines only when the amplitude of said identification signal is higher than a predetermined value.

9. The circuit arrangement of claim 8, wherein said identification signal is supplied from said detector to control said second gate through a low-pass filter.

10. circuit arrangement for demodulating the chrominance signal portion of a color television signal in an apparatus for receiving at least said color television signal, the chrominance signal being coded according to a system in which two color-difference signals are inserted therein by means of a subcarrier modulation process and simultanteously transmitted, a periodic line scanning frequency switching of the subcarrier phase taking place, there being present in said chrominance signal a single signal of constant phase having a plurality of oscillations at the subcarrier frequency and serving as a reference signal for the generation of a reference subcarrier for the demodulation of said modulated subcarrier and as an identification signal for controlling a first change-over switch which operates at line frequency to ensure that the two color-difference signals are demodulated with correct phases of said reference subcarrier, said single signal being inserted in part of every second line scanning period of said modulated subcarrier, said arrangement comprising a switching voltage generator consisting of a bi-stable multivibrator which receives line frequency pulses and provides a signal to drive said first change-over switch; a passive crystal filter; a first electronic gate which is controlled by line frequency pulses and opens during every line scanning period, said first gate receiving said chrominance signal and allowing the passage of said single signal to a second change-over switch having two positions and two outputs, said second change-over switch being controlled by said signal from said switching voltage generator so as to change position during every line scanning period, a first output of said second change-over switch being connected to said passive crystal filter so as to furnish during only every second line scanning period said single signal to said passive filter which supplies said plurality of oscillations at said subcarrier frequency; and a first amplitude detector circuit which receives said plurality of oscillations from said passive filter for supplying said identification signal, the second output of said second change-over switch being connected by way of a second amplitude detector circuit and a second electronic gate to a synchronization input of said switching voltage generator, said second electronic gate being controlled by said identification signal supplied from said first amplitude detector circuit so as to allow the passage of signals from said second output of said second change-over switch to said synchronization input of said switching voltage generator only when said identification signal is lower than a predetermined value.

11. The circuit arrangement of claim 10, wherein said apparatus is a television receiver.

* * * * *